(12) United States Patent
Sabin

(10) Patent No.: US 12,500,756 B2
(45) Date of Patent: Dec. 16, 2025

(54) AUTOMATED SECRET SECURE REPOSITIONING

(71) Applicant: DigiCert, Inc., Lehi, UT (US)

(72) Inventor: Jason Allen Sabin, Lehi, UT (US)

(73) Assignee: DigiCert, Inc., Lehi, UT (US)

( * ) Notice: Subject to any disclaimer, the term of this patent is extended or adjusted under 35 U.S.C. 154(b) by 254 days.

(21) Appl. No.: 18/192,179

(22) Filed: Mar. 29, 2023

(65) Prior Publication Data

US 2024/0333498 A1   Oct. 3, 2024

(51) Int. Cl.
*H04L 9/08* (2006.01)

(52) U.S. Cl.
CPC .......... *H04L 9/0894* (2013.01); *H04L 9/0816* (2013.01)

(58) Field of Classification Search
CPC .. H04L 9/0894; H04L 9/0816; H04L 67/1091
See application file for complete search history.

(56) References Cited

U.S. PATENT DOCUMENTS

| | | |
|---|---|---|
| 7,734,962 B2 | 6/2010 | Sabin et al. |
| 8,107,736 B2 | 1/2012 | Brown et al. |
| 8,443,416 B2 | 5/2013 | Sabin et al. |
| 8,468,455 B2 | 6/2013 | Jorgensen et al. |
| 8,499,000 B2 | 7/2013 | Brown et al. |
| 8,522,247 B2 | 8/2013 | Brown et al. |
| 8,561,137 B2 | 10/2013 | Sabin et al. |
| 8,595,647 B2 | 11/2013 | Sabin et al. |
| 8,639,926 B2 | 1/2014 | Brown et al. |
| 8,806,014 B2 | 8/2014 | Carter et al. |
| 8,849,716 B1 * | 9/2014 | Everhart ................ H04N 7/173 707/821 |
| 8,948,399 B2 | 2/2015 | Sabin et al. |
| 9,246,934 B2 | 1/2016 | Sabin et al. |
| 9,317,407 B2 | 4/2016 | Sabin et al. |
| 9,350,536 B2 | 5/2016 | Sabin |
| 9,454,406 B2 | 9/2016 | Sabin et al. |
| 9,479,338 B2 | 10/2016 | Sabin |
| 9,519,777 B2 | 12/2016 | Brown et al. |
| 9,848,017 B2 | 12/2017 | Brown et al. |
| 9,882,965 B2 | 1/2018 | Sabin et al. |
| 9,894,098 B2 | 2/2018 | Sabin |
| 9,929,921 B2 | 3/2018 | Brown et al. |
| 10,057,113 B2 | 8/2018 | Sabin et al. |
| 10,148,657 B2 | 12/2018 | Brown et al. |
| 10,178,183 B2 | 1/2019 | Sabin et al. |

(Continued)

*Primary Examiner* — Joseph L Greene
(74) *Attorney, Agent, or Firm* — Baratta Law PLLC; Lawrence A. Baratta, Jr.; Ryan Odessa

(57) ABSTRACT

Systems and methods for automated repositioning of secrets to a secure location include, responsive to detection of one or more secrets and corresponding storage locations of the one or more secrets, analyzing the corresponding storage locations with respect to policy for the one or more secrets; and, responsive to any of the one or more secrets being stored in a less secure location than the policy, automatically repositioning the any of the one or more secrets to a secure location and reconfiguring any service utilizing the any of the one or more secrets to update to the secure location. The one or more secrets include any of a password, a private key, an Application Programming Interface (API) key, a Secure Shell (SSH) key, a token, a certificate, and a credential.

20 Claims, 3 Drawing Sheets

(56) References Cited

U.S. PATENT DOCUMENTS

| | | |
|---|---|---|
| 10,503,914 B2 | 12/2019 | Sabin et al. |
| 10,958,437 B2 | 3/2021 | Sabin |
| 11,170,316 B2 | 11/2021 | Brown et al. |
| 11,361,065 B2 | 6/2022 | Sabin et al. |
| 11,783,062 B2* | 10/2023 | Lounsberry ......... G06F 21/6218 726/30 |
| 2009/0300495 A1 | 12/2009 | Brown et al. |
| 2010/0131641 A1 | 5/2010 | Brown et al. |
| 2010/0251141 A1 | 9/2010 | Sabin et al. |
| 2011/0231846 A1 | 9/2011 | Sabin et al. |
| 2012/0066487 A1 | 3/2012 | Brown et al. |
| 2012/0084844 A1 | 4/2012 | Brown et al. |
| 2012/0271936 A1 | 10/2012 | Burch et al. |
| 2013/0326063 A1 | 12/2013 | Burch et al. |
| 2014/0019762 A1 | 1/2014 | Sabin |
| 2014/0052849 A1 | 2/2014 | Sabin |
| 2014/0195800 A1 | 7/2014 | Sabin et al. |
| 2014/0237091 A1 | 8/2014 | Sabin et al. |
| 2016/0173588 A1* | 6/2016 | Del Puerto Garcia ...................... G06F 3/04842 709/203 |
| 2016/0239320 A1 | 8/2016 | Kranendonk et al. |
| 2016/0277193 A1* | 9/2016 | Sabin ...................... H04L 9/321 |
| 2016/0365985 A1 | 12/2016 | Pilcher et al. |
| 2019/0268165 A1* | 8/2019 | Monica ................... H04L 63/10 |
| 2021/0056198 A1 | 2/2021 | Choules et al. |
| 2022/0092168 A1 | 3/2022 | Brown et al. |
| 2022/0247554 A1* | 8/2022 | Peddada ............... H04L 9/0897 |
| 2022/0269828 A1* | 8/2022 | Raman .................. H04L 9/0819 |

\* cited by examiner

AUTOMATED SECRET SECURE REPOSITIONING

FIELD OF THE DISCLOSURE

The present disclosure relates generally to networking and computing. More particularly, the present disclosure relates to systems and methods for automated repositioning of secrets to a secure location.

BACKGROUND OF THE DISCLOSURE

Enterprises often have secrets literally located and distributed across all of their networks, systems, file servers, and code repositories. Some of these locations are secure, some of them are not, and secrets may be located in unsecure locations. A secret can be a password, private key, Application Programming Interface (API) key, Secure Shell (SSH) keys, tokens, credentials or any other type of secret information. Managing secrets is a difficult undertaking. Often, enterprises do not know when secrets are compromised. A large portion of data breaches are often linked to improper secret management.

BRIEF SUMMARY OF THE DISCLOSURE

The present disclosure relates to systems and methods for automated repositioning of secrets in a secure location. Specifically, the present disclosure includes identification and discovery of secrets, evaluation of location of a given secret, and movement of the given secret to a secure location, namely a secure process to reposition secrets when they are determined to be in an insecure location.

In various embodiments, the present disclosure includes a method having steps, a processing device configured to implement the steps, a cloud service configured to implement the steps, and a non-transitory computer-readable medium storing instructions that, when executed, cause one or more processors to implement the steps. The steps include, responsive to detection of one or more secrets and corresponding storage locations of the one or more secrets, analyzing the corresponding storage locations with respect to policy for the one or more secrets; and, responsive to any of the one or more secrets being stored in a less secure location than the policy, automatically repositioning the any of the one or more secrets to a secure location and reconfiguring any service utilizing the any of the one or more secrets to update to the secure location.

The one or more secrets can include any of a password, a private key, an Application Programming Interface (API) key, a Secure Shell (SSH) key, a token, a certificate, and a credential. The steps can further include, prior to the analyzing, scanning enterprise network resources to detect the one or more secrets and the corresponding storage locations. The scanning can include scanning networks, Internet Protocol (IP) addresses, ports, file shares, Lightweight Directory Access Protocol (LDAP) directories, code repositories, blockchains, and other location of files and data associated with the enterprise network resources. The scanning can include scanning network resources for keys and certificates and scanning code repositories for passwords and credentials. The scanning can include searching for file extensions used to identify private keys. The scanning can include searching files and code using regular expression matching.

The each of the one or more secrets can be one of a plurality of secret types, wherein each of the plurality of secret types has a minimum security level defined in policy, and wherein the insecure location is where the corresponding storage location has a security level less than the minimum security level. The security level and the minimum security level can be one of a plurality of security levels defined in FIPS PUB 140-2. The secure location can be one of a Hardware Security Module (HSM), a secure vault, and a secure file server, and wherein the reconfiguring includes changing the service to obtain the corresponding secret in the secure location.

The any of the one or more secrets can be a private key, wherein the automatically repositioning includes regenerating and storing the private key in one of a Hardware Security Module (HSM), a secure vault, and a secure file server, and wherein the wherein the reconfiguring includes changing the service to obtain the private key in the one of the HSM, the secure vault, and the secure file server. The any of the one or more secrets can be a password or credential located in code in a code repository, wherein the automatically repositioning includes storing the password or credential in one of a Hardware Security Module (HSM), a secure vault, and a secure file server, and wherein the wherein the reconfiguring includes changing the code to obtain the password or credential in the one of the HSM, the secure vault, and the secure file server.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for automated repositioning of secrets in a secure location. Specifically, the present disclosure include identification and discovery of secrets, evaluation of location of a given secret, and movement of the given secret to a secure location, namely a secure process to reposition secrets when they are determined to be in an insecure location.

§ 1 Enterprise Network

Figure 1:
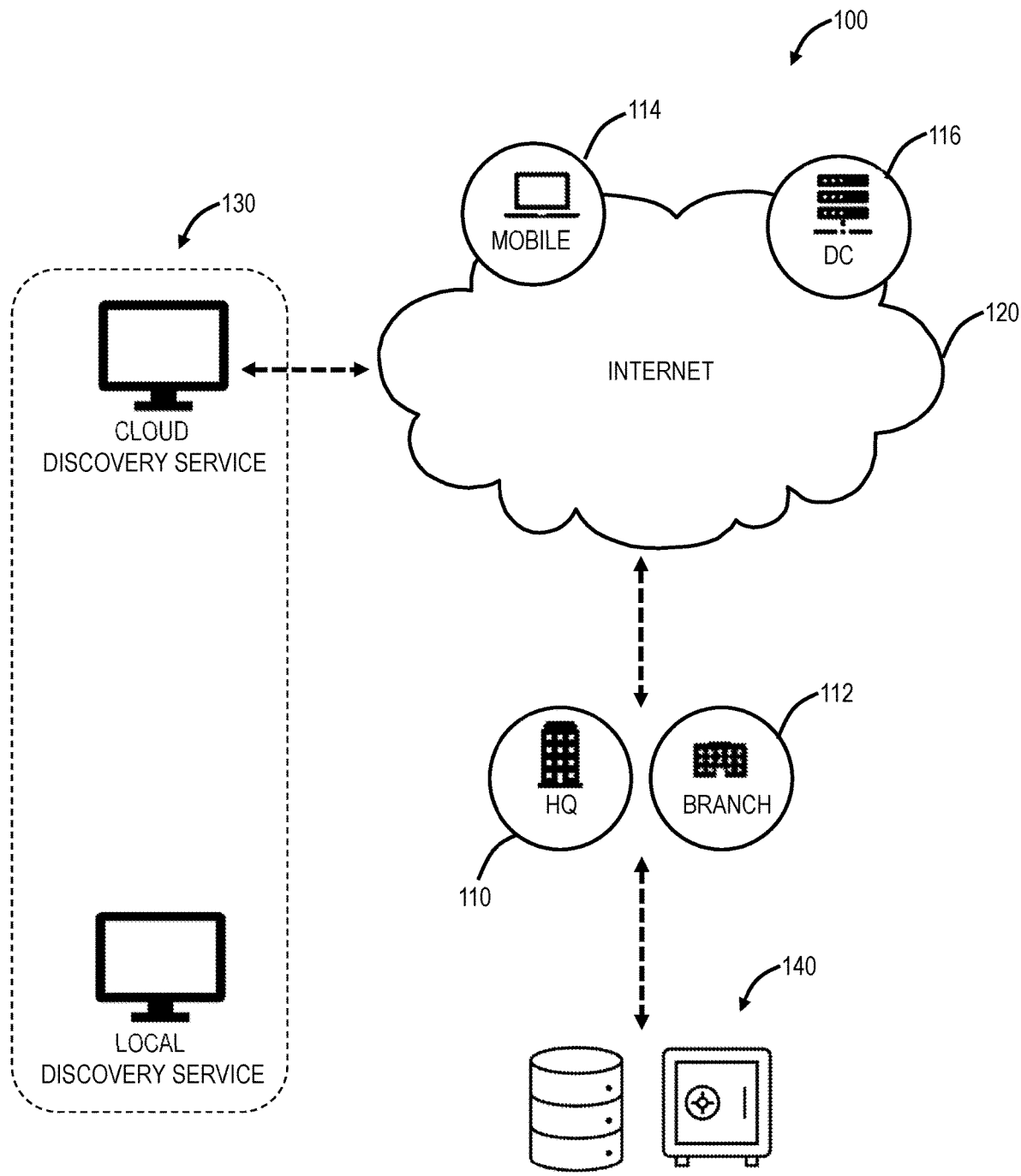
FIG. 1 is a network diagram of a network that includes enterprise networking resources, the Internet, a discovery service, and secure storage resources.

FIG. 1 is a network diagram of a network 100 that includes enterprise networking resources 110, 112, 114, 116, the Internet 120, a discovery service 130, and secure storage resources 140. The network 100 is presented for illustration purposes and one skilled in the art will appreciate there can be various different deployments of enterprise networking resources 110, 112, 114, 116, all of which are contemplated herewith. The enterprise networking resources 110, 112, 114, 116 can include, e.g., headquarters (HQ) 110, branch offices 112, mobile devices 114, and cloud hosted resources, such as in a data center (DC) 116. The HQ 110 and the branch offices 112 can include Local Area Network (LANs) with hosts (computers), file servers, Internet of Things (IoT) devices, and the like. The mobile devices 114 can be remote workers, road warriors, etc. with laptops, smart phones, tablets, etc. The cloud hosted resources can be hosted applications, file shares, code repositories, and the like.

Collectively, the enterprise networking resources 110, 112, 114, 116 include networks, Internet Protocol (IP) addresses, ports, file shares, Lightweight Directory Access Protocol (LDAP) directories and the like, code repositories, blockchains, and any other location for storing files, data, etc. As discussed herein, there can be secrets located across any of the enterprise networking resources 110, 112, 114, 116. In an embodiment, the present disclosure includes the discovery service 130 which can be cloud-based and/or local via on-site agents. Those skilled in the art will recognize the location of the discovery service 130 can be anywhere. Details of the discovery service 130 are described herein, and, generally, the discovery service 130 is configured to identify secrets in the enterprise networking resources 110, 112, 114, 116.

§ 2 Processing System

Figure 2:
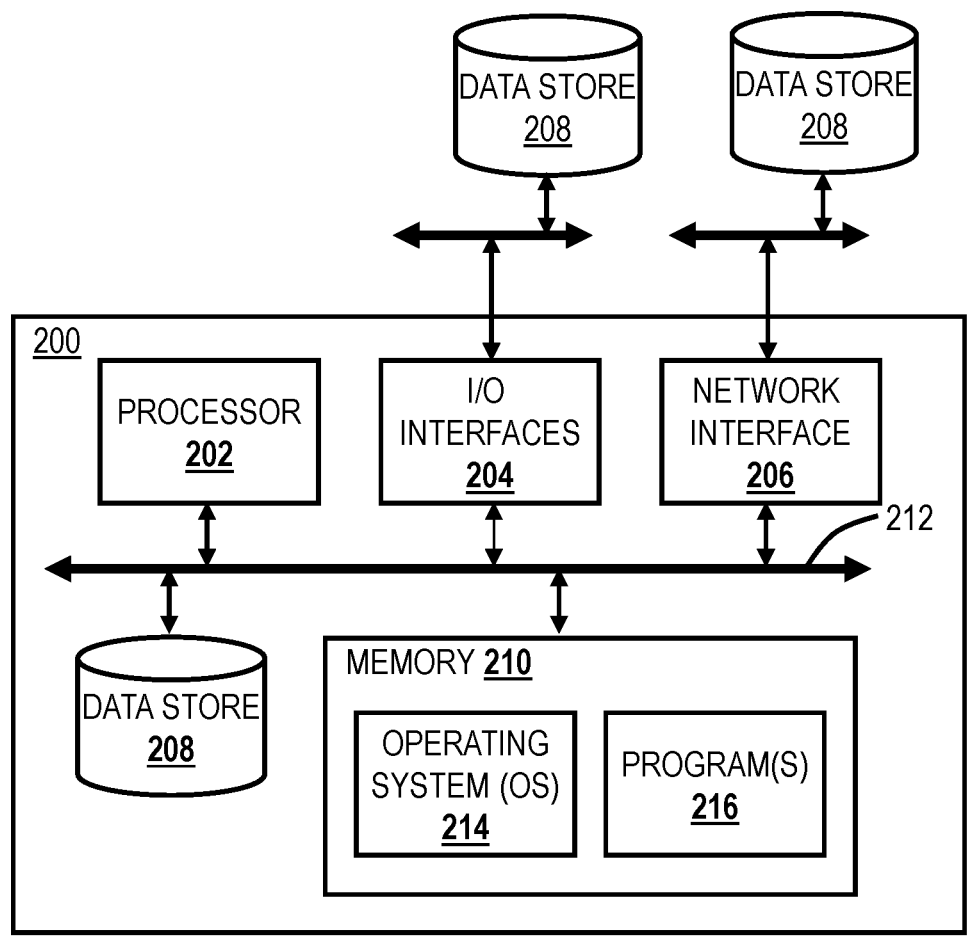
FIG. 2 is a block diagram of a processing system, which may be represent a device in the enterprise networking resources in the network of FIG. 1.

FIG. 2 is a block diagram of a processing system 200, which may be represent a device in the enterprise networking resources 110, 112, 114, 116. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network, such as the Internet. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Of note, the general architecture of the processing system 200 can define any device in the enterprise networking resources 110, 112, 114, 116. However, the processing system 200 is merely presented as an example architecture for illustration purposes. Other physical embodiments are contemplated, including virtual machines (VM), software containers, appliances, network devices, cloud infrastructure, and the like. That is, the present disclosure contemplates any device in the enterprise networking resources 110, 112, 114, 116 that can store or include secrets thereon.

In an embodiment, the local discovery service 130 can be a software agent located on a processing device 200 inside a given network with the enterprise networking resources 110, 112, 114, 116. This can be, e.g., one of the programs 216 on a user device, on a server, etc. In another embodiment, one or more processing systems 200 can be configured in a cluster and/or in a cloud system, for the cloud discovery service 130. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

In a further embodiment, there can be a combination of the local discovery service 130 and the cloud discovery service 130. For example, the cloud discovery service 130 can be configured to interact with one or more local discovery services 130 which can be sensor agents, e.g., small software applications installed in strategic locations, to scan the network to discover secrets. Those skilled in the art will appreciate there can be various discovery service 130 approaches to scan the enterprise networking resources 110, 112, 114, 116 to detect secrets; all of which are contemplated herewith.

§ 3 Discovery Service

Again, the discovery service 130 is configured to scan the enterprise networking resources 110, 112, 114, 116 to detect secrets. To that end, the discovery service 130 is configured to scan devices in the enterprise networking resources 110, 112, 114, 116. As described herein, scanning can include both scanning network resources (IP, ports, etc.), as well as scanning file shares (code repositories, etc.). The objective is to find secrets-a password, private key, API key, SSH keys, tokens, credentials or any other type of secret information. An example of the discovery service 130 can include Discovery cloud scan service, available from Digicert, Inc., the applicant of the present application. The discovery service 130 can also include the secret scanning service, available from GitHub. Of course, those skilled in the art will appreciate any type of secret scanning service is contemplated herewith.

The Discovery cloud scan service uses scanning tools to detect a company's public and private Transport Layer Security (TLS)/Secure Socket Layer (SSL) certificates. For example, cloud-based sensors can be used to identify public-facing TLS/SSL certificates. Network-based sensors and agents can be used to identify the digital certificates located on a company's network. These scans provide detailed information about certificates in your network: Common name, Expiration date, Certificate status, Issuing certificate authority, Ports and IP addresses of the certificate host, Certificate security rating, Server security issues, TLS/SSL vulnerabilities, etc.

GitHub is one example of a code repository which is where snippets and patches of source code for software programs are archived in an organized way. Codes stored in a code repository can be retrieved easily in the future. Those skilled in the art will recognize that any code repository is contemplated herewith. Also, the discovery service 130 is not limited to code repositories, but can also scan file shares, including local hard drives on user machines, file servers in the enterprise network, and file servers in the cloud.

During a scan with the discovery service 130, there are common file extensions that can be used to identity secrets such as private keys, others could be using Regular Expressions (regex's) looking for specific secrets or files that are configured with a PASSWORD=, TOKEN=, SECRET=, API_KEY=, KEY=, PASSPHRASE= or any other technique of secret detection. For file format, the discovery service 1300 could look at files with the following extensions *.p12, *.pfx*.PEM, *.PPK, *.PRI, *.KEY, *.SEC, *.PKCS# (hashtag represents different numbers such as #8 and #11).

§ 4 Secret Identification and Location Analysis

An output of the discovery service 130 includes a list of detected secrets and their corresponding locations. In an embodiment, the discovery service 130 can be configured, once a secret is identified, to perform a location analysis to determine if the location found is secure enough. In another embodiment, this location analysis can be performed by a separate service from the discovery service 130, e.g., a secret location analysis service. Various implementations for the location analysis are contemplated.

In an embodiment, a location's security can be based on FIPS PUB 140-2, Security Requirements for Cryptographic Modules, May 25, 2001, the contents of which are incorporated by reference. For example, FIPS PUB 140-2 defines four levels of security, such as for a Hardware Security Module (HSM):

Level 1: The most basic security level which requires the inclusion of only one approved algorithm or security function, but does not require physical protection.

Level 2: Demands the incorporation of tamper-evidence and role-based authentication in the HSM.

Level 3: Requires tamper resistance along with tamper evidence and identity-based authentication.

Level 4: The most secure level involves recognition and mitigation of assaults regarding physical security and environmental conditions ensuring the comprehensive security of the HSM even when operating in a physically unprotected environment.

FIPS PUB 140-2 can also apply to software and/or firmware programs and modules, i.e., anywhere data can be stored in the enterprise networking resources 110, 112, 114, 116. Of course, other techniques of classifying security of a storage location are contemplated herewith with FIPS PUB 140-2 merely presented as an example.

The objective of the location analysis is to determine which identified secrets are stored in insecure locations. This is based on pre-configured policy for the enterprise. Subsequent to the analysis, a policy engine and configuration is used to determine i) the type of a given secret, ii) what level of storage is needed for the type, and iii) whether there is need to reposition the secret, based on the level of storage.

Here is an example of configuration for the policy engine:

| Secret type | Storage security requirements |
|---|---|
| Private key | FIPS 140-2 Level 3 or above |
| Password | Hashed, salted, stored in a secure Vault |
| API Keys | Encrypted and stored in a secure Vault |
| Secret Tokens | Encrypted and stored in a secure Vault |

The above table is presented as an example for illustration purposes. The present disclosure contemplates any secret type and any storage requirements.

§ 5 Automated Repositioning of Secrets in a Secure Location

The output of the location analysis includes a list of secrets and their locations, with the secrets being stored in the enterprise networking resources 110, 112, 114, 116 insecurely. By insecurely, we mean the identified storage location's security requirements do not match the required level for security associated with that type of secret. For example, a private key is found in the open on a Hypertext Transfer Protocol (HTTP) server or on a TLS endpoint. In another example, code in a code repository includes a password in clear text or some other credentials included in the code.

The present disclosure includes automated repositioning of these identified secrets, namely to an appropriate location that has the security required. In addition, the automated repositioning includes reconfiguration to adjust to any moved location. That is, for a generic secret, the present disclosure includes moving the secret from the given file location to another location and reconfigure the service that utilizes the secret.

The following describe some examples of secrets, insecure locations, automated repositioning of the secret, and automated reconfiguration of a service using the secret.

For a private key discovered in an insecure location, assume the private key is used by some service (e.g., HTTPS server, TLS endpoint, or any service), the identified private key can be delete, a new private key can be generated and stored in the appropriate secure location (e.g., an HSM or any storage location meeting FIPS 140-2 Level 3 or above), and the service can be reconfigured to use the regenerated private key in the new appropriate secure location. FIPS 140-2 or 3 are recommended but not necessary. In few cases you can still utilize a vault (defined as a secure storage) for securing that secret/private key, etc.

For credentials (user identifiers, passwords, Personal Identifiable Information (PII), etc., the discovery service 130 can identify such information in clear text in a code repository. For example, a Kubernetes configuration file can include a password in clear text. The automated repositioning and reconfiguration can include, e.g., encrypting the password in the configuration file, moving the password to a secret storage location, e.g., an HSM, a secure vault, a secure file server, etc. The configuration file can be updated to include a hash in the code that can be used to point to the password in the secret storage location.

In a generalized example, a given secret can be stored at some level of security, e.g., FIPS 140-2 Level 1 or 2, but it needs to be stored at FIPS 140-2 Level 3 or above. The present disclosure includes repositioning of that secret to the secure storage resources 140, which can generally be software, hardware, and/or firmware that supports FIPS 140-2 Level 3 or above. A typical example of the secure storage resources 140 can include HSMs, secure vaults, secure file servers, but any physical implementation is contemplated.

§ 6 Process

Figure 3:
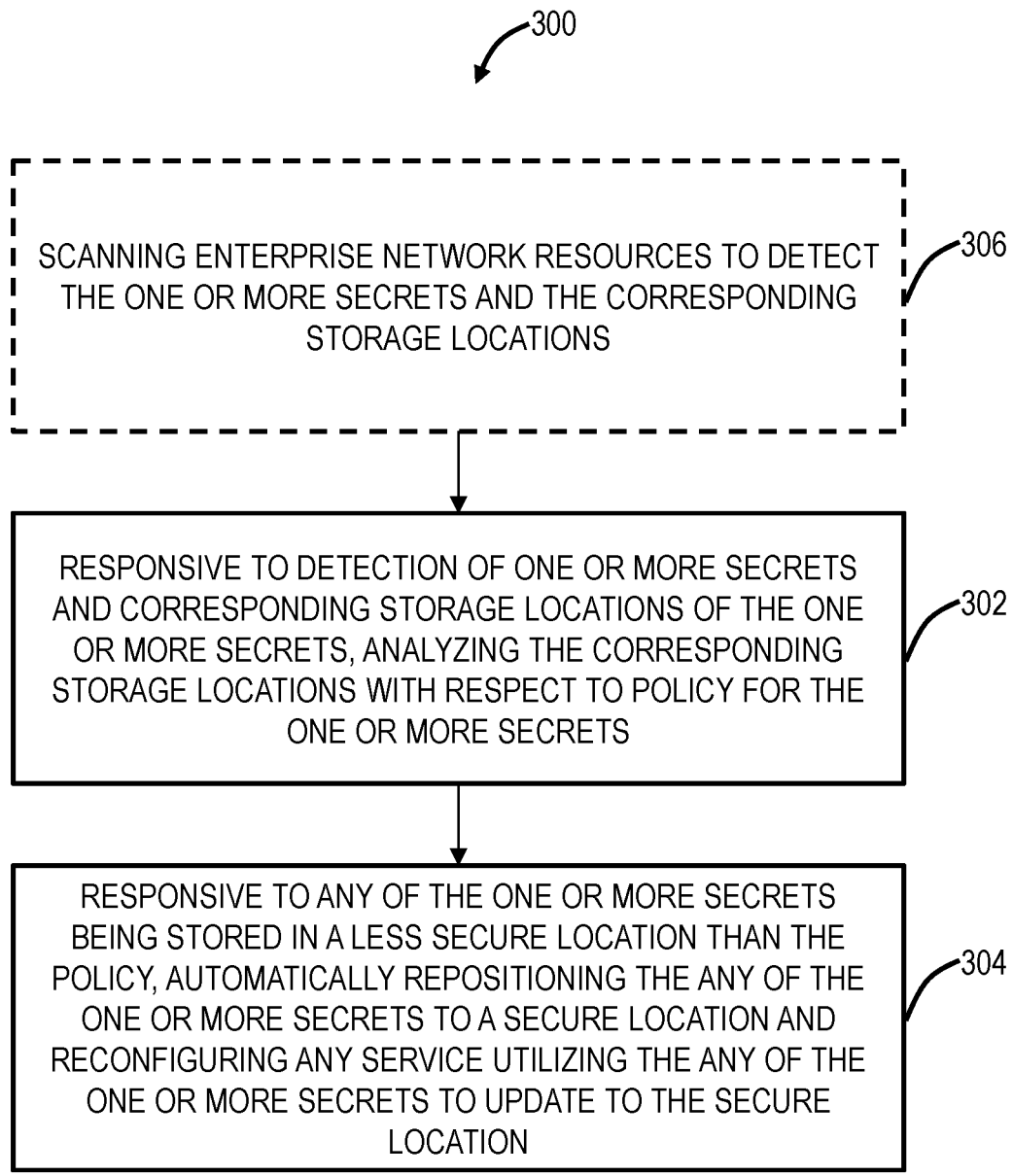
FIG. 3 is a flowchart of a process for detection and automated repositioning of secrets to a secure location.

FIG. 3 is a flowchart of a process 300 for detection and automated repositioning of secrets to a secure location. The process 300 contemplates implementation as a method having steps, via one of more of the processing devices 200 configured to implement the steps, via the discovery service 130 configured to implement the steps, via the discovery service 130 and/or other services working together to implement the steps, and via instructions stored in a non-transitory computer-readable medium that, when executed, cause one or more processors to perform the steps.

The process 300 includes, responsive to detection of one or more secrets and corresponding storage locations of the one or more secrets, analyzing the corresponding storage locations with respect to policy for the one or more secrets (step 302); and, responsive to any of the one or more secrets being stored in a less secure location than the policy, automatically repositioning the any of the one or more secrets to a secure location and reconfiguring any service utilizing the any of the one or more secrets to update to the secure location (step 304).

The one or more secrets can include any of a password, a private key, an Application Programming Interface (API) key, a Secure Shell (SSH) key, a token, a certificate, and a credential. The process 300 can further include, prior to the analyzing, scanning enterprise network resources to detect the one or more secrets and the corresponding storage locations (step 306). The scanning can include scanning networks, Internet Protocol (IP) addresses, ports, file shares, Lightweight Directory Access Protocol (LDAP) directories, code repositories, blockchains, and other location of files and data associated with the enterprise network resources. The scanning can include scanning network resources for keys and certificates and scanning code repositories for passwords and credentials. The scanning can include searching for file extensions used to identify private keys. The scanning can include searching files and code using regular expression matching.

The each of the one or more secrets can be one of a plurality of secret types, wherein each of the plurality of secret types can have a minimum security level defined in policy, and wherein the insecure location can be where the corresponding storage location has a security level less than the minimum security level. The security level and the minimum security level can be one of a plurality of security levels defined in FIPS PUB 140-2. The secure location can be a Hardware Security Module (HSM) a secure vault, or a secure file server, and wherein the reconfiguring can include changing the service to obtain the corresponding secret in the secure location.

The any of the one or more secrets can be a private key, wherein the automatically repositioning includes regenerating and storing the private key in a Hardware Security Module (HSM), and wherein the wherein the reconfiguring includes changing the service to obtain the private key in the HSM. The any of the one or more secrets can be a password or credential located in code in a code repository, wherein the automatically repositioning includes storing the password or credential in a Hardware Security Module (HSM), and wherein the wherein the reconfiguring includes changing the code to obtain the password or credential in the HSM.

§ 7 Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
    responsive to detection of one or more secrets and corresponding storage locations of the one or more secrets across heterogeneous enterprise resources, analyzing the corresponding storage locations based on a policy engine that maps each type of the one or more secrets to a required Federal Information Processing Standards Publication (FIPS PUB) 140-2 security level; and
    responsive to identifying any of the one or more secrets being stored in a storage location having a security level that fails to satisfy a required FIPS PUB 140-2 security level defined for the type of secret, automatically repositioning the any of the one or more secrets to a secure location satisfying the required FIPS PUB 140-2 security level, and automatically reconfiguring any dependent service utilizing the any of the one or more secrets by modifying a configuration file or credential reference to retrieve the any of the one or more secrets from the secure location.

2. The method of claim 1, wherein the one or more secrets include any of a password, a private key, an Application Programming Interface (API) key, a Secure Shell (SSH) key, a token, a certificate, and a credential.

3. The method of claim 1, wherein the steps further include:
    prior to the analyzing, scanning enterprise network resources comprising networks, file shares, cloud-hosted applications, directories, and code repositories to detect the one or more secrets and the corresponding storage locations, wherein the scanning is configured to identify secret-related data across multiple resource types and protocols.

4. The method of claim 3, wherein the scanning includes scanning networks, Internet Protocol (IP) addresses, and file shares, and further includes identifying secret-related content based on regular expression matching and scanning for file extensions associated with private keys, including .p12, .pfx, .pem, .ppk, .key, and .pkcs# files.

5. The method of claim 3, wherein the scanning includes scanning network resources for keys and certificates and scanning code repositories for passwords and credentials.

6. The method of claim 3, wherein the scanning includes searching for file extensions used to identify private keys.

7. The method of claim 3, wherein the scanning includes searching files and code using regular expression matching.

8. The method of claim 1, wherein each of the one or more secrets is one of a plurality of secret types, wherein each secret type is mapped by a policy engine to a minimum required FIPS PUB 140-2 security level, and wherein the insecure location is determined by evaluating whether the current storage location satisfies the minimum required FIPS PUB 140-2 level for corresponding secret type.

9. The method of claim 8, wherein the security level and the minimum security level are one of a plurality of security levels defined in FIPS PUB 140-2.

10. The method of claim 1, wherein the secure location is one of a Hardware Security Module (HSM), a secure vault, and a secure file server, and wherein the reconfiguring includes changing the service to obtain the corresponding secret in the secure location.

11. The method of claim 1, wherein the any of the one or more secrets is a private key, wherein the automatically repositioning includes deleting the detected private key, regenerating a new private key using a secure cryptographic module, and storing the new private key in one of a Hardware Security Module (HSM), a secure vault, and a secure file server, and wherein the reconfiguring includes updating a dependent service's key store configuration to reference the new private key location.

12. The method of claim 1, wherein the any of the one or more secrets is a password or credential located in code in a code repository, wherein the automatically repositioning includes storing the password or credential in one of a Hardware Security Module (HSM), a secure vault, and a secure file server, and wherein the wherein the reconfiguring includes changing the code to obtain the password or credential in the one of the HSM, the secure vault, and the secure file server.

13. A non-transitory computer-readable medium comprising instructions that, when executed, cause one or more processors to perform steps of:
    responsive to detection of one or more secrets and corresponding storage locations of the one or more secrets across heterogenous enterprise resources, analyzing the corresponding storage locations based on a policy engine that maps each type of the one or more secrets to a required Federal Information Processing Standards Publication (FIPS PUB) 140-2 security level; and
    responsive to identifying any of the one or more secrets being stored in a storage location having a security level that fails to satisfy a required FIPS PUB 140-2 security defined for the type of secret, automatically repositioning the any of the one or more secrets to a secure location satisfying the required FIPS PUB 140-2 security level, and automatically reconfiguring any dependent service utilizing the any of the one or more secrets by modifying a configuration file or credential reference to retrieve the any of the one or more secrets from the secure location.

14. The non-transitory computer-readable medium of claim 13, wherein the one or more secrets include any of a password, a private key, an Application Programming Interface (API) key, a Secure Shell (SSH) key, a token, a certificate, and a credential.

15. The non-transitory computer-readable medium of claim 13, wherein the steps further include:
prior to the analyzing, scanning enterprise network resources comprising networks, file shares, cloud-hosted applications, directories, and code repositories to detect the one or more secrets and the corresponding storage locations, wherein the scanning is configured to identify secret-related data across multiple resource types and protocols.

16. The non-transitory computer-readable medium of claim 13, wherein each of the one or more secrets is one of a plurality of secret types, wherein each secret type is mapped by a policy engine to a minimum required FIPS PUB 140-2 security level, and wherein the insecure location is determined by evaluating whether the current storage location satisfies the minimum required FIPS PUB 140-2 level for the corresponding secret type.

17. The non-transitory computer-readable medium of claim 13, wherein the secure location is one of a Hardware Security Module (HSM), a secure vault, and a secure file server, and wherein the reconfiguring includes changing the service to obtain the corresponding secret in the secure location.

18. The non-transitory computer-readable medium of claim 13, wherein the any of the one or more secrets is a private key, wherein the automatically repositioning includes deleting the detected private key, regenerating a new private key using a secure cryptographic module, and storing the new private key in one of a Hardware Security Module (HSM), a secure vault, and a secure file server, and wherein the reconfiguring includes updating a dependent service's key store configuration to reference the new private key location.

19. The non-transitory computer-readable medium of claim 13, wherein the any of the one or more secrets is a password or credential located in code in a code repository, wherein the automatically repositioning includes storing the password or credential in a Hardware Security Module (HSM), a secure vault, and a secure file server, and wherein the wherein the reconfiguring includes changing the code to obtain the password or credential in the one of the HSM, the secure vault, and the secure file server.

20. A processing device comprising:
one or more processors; and
memory storing instructions that, when executed, cause the one or more processors to perform:
responsive to detection of one or more secrets and corresponding storage locations of the one or more secrets across heterogeneous enterprise resources, analyze the corresponding storage locations based on a policy engine that maps each type of the one or more secrets to a required Federal Information Processing Standards Publication (FIPS PUB) 140-2 security level; and
responsive to identifying any of the one or more secrets being stored in a storage location having a security level that fails to satisfy a required FIPS PUB 140-2 security level defined for of secret, automatically reposition the any of the one or more secrets to a secure location satisfying the required FIPS PUB 140-2 security level, and automatically reconfigure any dependent service utilizing the any of the one or more secrets by modifying a configuration file or credential reference to retrieve the any of the one or more secrets from the secure location.

* * * * *